C. P. KIMBALL
Carriage-Seat.
No. 69,102.
Patented Sept. 24, 1867.
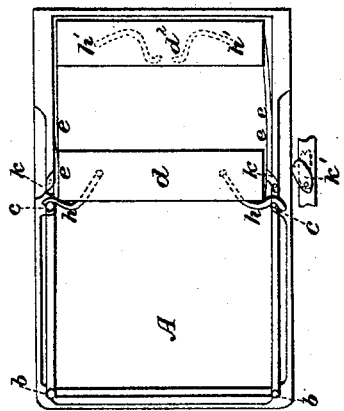
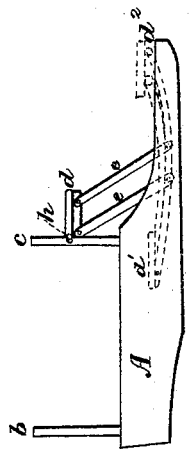
Witnesses:
Wm Frank Seavey
Henry C. Houston.
Inventor:
C P Kimball
Per his atty
W. H. Clifford

United States Patent Office.

CHARLES P. KIMBALL, OF PORTLAND, MAINE.

Letters Patent No. 69,102, dated September 24, 1867.

---

IMPROVEMENT IN JUMP-SEATS FOR CARRIAGES.

---

The Schedule referred to in these Letters Patent and making part of the same.

---

TO ALL WHOM IT MAY CONCERN:

Be it known that I, CHARLES P. KIMBALL, of Portland, in the county of Cumberland, and State of Maine, have invented a new and useful Improvement in Jump-Seats for Carriages; and I hereby declare the following to be a full, clear, and exact description thereof, which will enable others to make and use my invention, reference being had to the accompanying drawings, forming part of this specification, in which—

Figure 1 shows a side elevation of a carriage body having my improvement connected therewith.

Figure 2, a top plan of the same.

Letters Patent of the United States, dated the 15th day of November, 1864, and numbered No. 45,050, have already been granted unto me for an improvement in carriages, which consisted of a movable or changeable seat, capable of occupying a position as a front seat to a two-seated vehicle, or of being thrown to the forward part of a carriage, where it would serve for a child's seat, &c. Such changeable seat, when in use as the front seat of a two-seated vehicle, rested against the forward posts which supported the top of such vehicle, from which fact it will be readily understood that the said changeable seat could only be thrown forward, or, in other words, described a curve of about one-quarter of a circle, of which the supports of said changeable seat might be considered as radii. When the back seat of such two-seated vehicle is intended to be alone used, it is evident that the said changeable seat, or jump-seat, as I have termed it, thrown forward, as it must be under such circumstances, near the dasher, might be considered an incumbrance to the vehicle. As shown in my previous patent, above referred to, the back seat of the vehicle can also be thrown forward at the same time that the forward seat is changed to a position immediately behind the dasher.

My present invention has relation to a method of so arranging the said front changeable seat as that it may not only be changed to its position immediately behind the dasher, but may also be swung or turned so as to rest immediately in front of the back seat, with the view that the back seat may then be swung or jumped over the said front seat when so placed, and thus the vehicle present the appearance of and have the roominess of a single-seated vehicle. Under this arrangement the forward seat, when so placed, is hidden from view. In my former invention the forward changeable seat, when up or in use as such forward seat, rested against the two forward posts that supported the carriage top. In my present invention it may, if desired, in being swung backward, pass between the said two posts, or it may be held in a somewhat inclined position against the said two posts, when it is sought to be used as a forward seat. Particular reference to the drawings will show clearly the nature of my improvement.

A shows a carriage body; b c show the back and forward posts to support a top thereto; d shows the forward changeable or jump-seat, supported by the adjustable posts e e, as in the previous patent. These I do not now claim. This forward seat is so constructed as that, when thrown backward, it will, if desired, pass between the two posts e e. Upon the under side of said seat d, thereto attached by a pivot, hinge, or joint, are seen the adjustable stops h; also adjustable stops k. The stops h, when the seat is swung up for use, as in fig. 1, may be turned outward, so as to rest against the posts e, as seen in both figures in the drawing. This holds the seat in position.

When the said stops are turned underneath the seat, as seen at h', fig. 2, the seat, passing between the two posts e, will drop to the floor of the carriage behind the said posts, as shown at d¹, fig. 1. Thus it will be seen that the seat may be swung from d¹ to d², fig. 1.

When in the position shown at d¹, fig. 1, the back jump-seat, if there be one, may be swung forward over the said d¹, and the vehicle would have the appearance of a single-seated one. Thus it will be seen that with this improvement the seat d is capable of being placed in three positions: to serve as a front seat, as at d, a child's seat, as at d², or not be employed at all, as at d¹.

Besides the adjustable stops h the stops indicated at k may be employed. These stops are attached to the frame of the carriage, at the bottom of the body, on the inside, swing on pivots, have slots in the forward ends to receive the pivoted supports e e of the seat, and hold it up, as in fig. 1. Turned to one side, as indicated by the dotted lines in the detail at k', they will allow the seat to fall to the position shown at d¹.

What I claim as my invention, and desire to secure by Letters Patent, is—

1. Supporting a jump-seat, such as is shown at d, when the same is in use as the forward seat of a vehicle, by adjustable stops, attached to the seat itself, the carriage body, and operating against the posts of a carriage, the supports of the seat, substantially as herein set forth and described.

2. In combination with the pivoted supports e of the carriage seat and the adjustable stops, as described, I claim shortening the seat d, so that it is capable of being placed in either of the three positions shown in fig. 1, substantially as described.

C. P. KIMBALL.

Witnesses:
WM. HENRY CLIFFORD,
HENRY C. HOUSTON.